US006662208B1

(12) United States Patent
Moeller et al.

(10) Patent No.: US 6,662,208 B1
(45) Date of Patent: Dec. 9, 2003

(54) SYSTEM FOR TRACKING THE HISTORY OF CHANNEL BASED NETWORK DEVICES

(75) Inventors: Douglas Moeller, Burlington, MA (US); Matthew Liste, New York, NY (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/412,689

(22) Filed: Oct. 5, 1999

Related U.S. Application Data

(60) Provisional application No. 60/151,727, filed on Aug. 31, 1999.

(51) Int. Cl.[7] ............................................. G06F 15/16
(52) U.S. Cl. .................. 709/203; 709/220; 709/221; 709/224; 370/395.53; 370/338; 370/352; 370/392
(58) Field of Search .................. 709/200, 225, 709/203, 221, 224, 220; 370/395.55, 338, 232, 259, 392; 37/417

(56) References Cited

U.S. PATENT DOCUMENTS

| | | | | | |
|---|---|---|---|---|---|
| 5,684,957 A | * | 11/1997 | Kondo et al. | ................ | 709/225 |
| 5,751,967 A | * | 5/1998 | Raab et al. | .................. | 709/220 |
| 5,914,938 A | * | 6/1999 | Brady et al. | ................. | 370/254 |
| 5,938,736 A | * | 8/1999 | Muller et al. | ................ | 370/392 |
| 6,092,078 A | * | 7/2000 | Adolfsson | ....................... | 700/3 |
| 6,279,035 B1 | * | 8/2001 | Brown et al. | ................ | 370/412 |
| 6,289,017 B1 | * | 9/2001 | Shani et al. | ........... | 370/395.53 |

* cited by examiner

*Primary Examiner*—David Wiley
*Assistant Examiner*—Phuoc H. Nguyen
(74) *Attorney, Agent, or Firm*—Steubing McGuinness & Manaras LLP

(57) ABSTRACT

A method and apparatus for determining the history of at least one network device (the "given device") in a set of channel-based network devices coupled to a network maintains a history memory to generate a history of the given device. To that end, the current status of the given device is recorded in the history memory at one or more selected times. The current status is retrieved at the selected times from a registration memory that has the current status of the given network device. A reply message with device data relating to the given device responsively is generated in response to receipt of an inquiry message requesting information about the given device. The device data represents at least one of the current status and the history of the given device.

50 Claims, 6 Drawing Sheets

FIG. 3

Elan Status

Elan Status for matthews_elan    LES/BUS Host: 192.32.86.22

LES NSAP   390000000000000001111111111400C5094800001
BUS NSAP   390000000000000001111111111400C5094800002

| Monitor | Client NSAP | LES VPI / VCI | BUS VPI / VCI | Last Polled |
|---|---|---|---|---|
| ☑ | 39000000000000000011111111102300012900000FF | 0 / 0 | 0 / 34 | 10/13/98 11:14 AM |
| ☑ | 390000000000000000CCCCCCCC02201004000000FF | 0 / 0 | 0 / 35 | 10/13/98 11:14 AM |

[Acknowledge Events] [Events]    [Close]

Events
Acknowledged

| ☐ CLIENT ID | HISTORY | 39000000000000000011111111102300012900000FF |
| ☐ CLIENT ID | HISTORY | 390000000000000000CCCCCCCC02201004000000FF |

FIG. 6

# SYSTEM FOR TRACKING THE HISTORY OF CHANNEL BASED NETWORK DEVICES

PRIORITY

This application claims priority from U.S. provisional patent application serial No. 60/151,727, filed Aug. 31, 1999, entitled "SYSTEM FOR TRACKING THE HISTORY OF CHANNEL BASED NETWORK DEVICES", the disclosure of which is incorporated herein, in its entirety, by reference.

FIELD OF THE INVENTION

The invention generally relates to data transmission networks and, more particularly, the invention relates to tracking the history of channel based network devices.

BACKGROUND OF THE INVENTION

Emulated local area networks ("ELANS") emulate a local area network that utilizes a non-channel based data transmission protocol (e.g., a broadcast data transmission protocol, such as Ethernet, that is commonly used by local area networks). Accordingly, from the perspective of other network devices in a given ELAN, all network devices coupled to an Ethernet switch implementing the given ELAN appear to be Ethernet devices. This includes network devices utilizing a channel-based data transmission protocol (e.g., asynchronous transfer mode).

Asynchronous Transfer Mode ("ATM") is a well known channel-based data transmission protocol that utilizes virtual channels to transmit data from a transmitting site to a receiving site. More specifically, a virtual channel typically is established (i.e., initialized) prior to message transmission, and subsequently utilized to transmit all message data during a single data transmission ("session"). Accordingly, for a given session, all data cells (i.e., 53 byte data packets) of a message utilize the same virtual channel as they are transmitted from the transmitting site to the receiving site.

When joining an ELAN, each ATM device registers with one or more Ethernet switches implementing the ELAN. Once registered with such switches, the status of each such ATM device is entered into a database. In particular, data indicating that each registered ATM switch is a member of the ELAN is entered into a registration database that is administered by a controller (e.g., a LAN emulation server) executing on the Ethernet switch. Conversely, when the given ATM switch is removed from the ELAN, the registration database is updated to delete data relating to the given ATM switch. Accordingly, among other things, the registration database maintains a listing of all active ATM network devices (and other channel-based network devices) that are members of the ELAN.

Problems arise on an ELAN when one or more channel-based network devices repeatedly are joined to and released from an ELAN. For example, such activity can indicate a resource problem in the ELAN. Accessing the registration database does not identify such network devices, however, since the registration database merely shows a listing of channel based network devices currently in the ELAN.

SUMMARY OF THE INVENTION

In accordance with one aspect of the invention, a method and apparatus for determining the history of at least one network device (the "given device") in a set of channel-based network devices coupled to a network maintains a history memory to generate a history of the given device. To that end, the current status of the given device is recorded in the history memory at one or more selected times. In preferred embodiments, the current status is retrieved at the selected times from a registration memory that includes the current status of the given network device. A reply message with device data relating to the given device responsively is generated in response to receipt of an inquiry message requesting information about the given device. The device data represents at least one of the current status and the history of the given device.

Once generated, the reply message may be forwarded to an administrator network device. In preferred embodiments, the set of network devices are members of an emulated local area network. The current status may be recorded in the history memory by polling the registration memory every polling interval, and updating the history memory based upon the data retrieved from the registration memory during each polling interval. During each polling interval, the history memory may be updated by recording data indicating the current status of the at least one of the set of network devices.

In preferred embodiments, the given device communicates via the asynchronous transfer mode protocol. The network also may include a LAN network device that communicates with other network devices in the network at least in part via a non-channel based protocol. For example, the LAN network device may communicate via the Ethernet protocol. In addition, the history for the given device preferably is stored in a management information base.

In accordance with another aspect of the invention, an apparatus and method of tracking the history of a given network device (that is a member of a set of network devices utilizing a channel based protocol) accesses a registration memory to determine the current status of the given network device, and records the determined current status in a history memory. The act of recording the current status produces history data for the given network device. Similar to the previously noted aspect of the invention, the current status of each member of the set of network devices is stored in the registration memory.

In preferred embodiments, the history data for the given network device is retrieved from the history memory in response to a request for such data. Such request may be receipt of a request message requesting the data. The history data then is included in a history message that may be forwarded to another network device coupled to the network. Among other things, the channel-based protocol may be the asynchronous transfer mode protocol. The current status may be recorded in the history memory once during every preselected interval. Such interval may be a polling interval. Moreover, the history of the network device may be stored in a management information base within the history memory. The history data for the given network device preferably indicates if the given network device is a member of the network at various times.

In accordance with other aspects of the invention, an apparatus and method of determining the history of a given network device utilizing a channel based protocol forwards an inquiry message from a first network device to a second network device. The inquiry message may request information about the given network device. The current status of the given network device preferably is recorded in a history memory associated with the second network device. The current status may be recorded at one or more selected times and be retrieved from a registration memory having the current status. The act of recording the current status preferably produces a history of the given network device. In response to receipt of the inquiry message, a reply message is generated having device data representing at least one of the current status and the history of the given network device. Once generated, the reply message is forwarded to the first network device.

In preferred embodiments, the device data is extracted from the reply message and displayed on a graphical user interface on the first network device. A configuration graphical user interface also may be displayed on the first network device. Such interface may include fields for entering polling data for polling the registration memory.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein:

FIG. 6 shows an emulated local area network graphical user interface that may be utilized to display history data about specified network devices in an emulated local area network selected in the interface shown in FIG. 5.

DESCRIPTION OF PREFERRED EMBODIMENTS

Preferred embodiments of the invention track the history of one or more network devices in an emulated local area network ("ELAN"). Those network devices preferably utilize channel-based data transmission protocols (e.g., the asynchronous transfer mode protocol, referred to herein as "ATM"), which utilize either virtual or actual channels to transmit data from a transmitting site to a receiving site. Accordingly, by way of example, ascertaining the history of a given ATM device in a given ELAN may reveal that such device has repeatedly been joined to and removed from the given ELAN. As known in the art, this device activity can suggest a potential resource problem within the ELAN. With this information, a network administrator consequently can attempt to ascertain and remedy the source of the problem.

Figure 1:
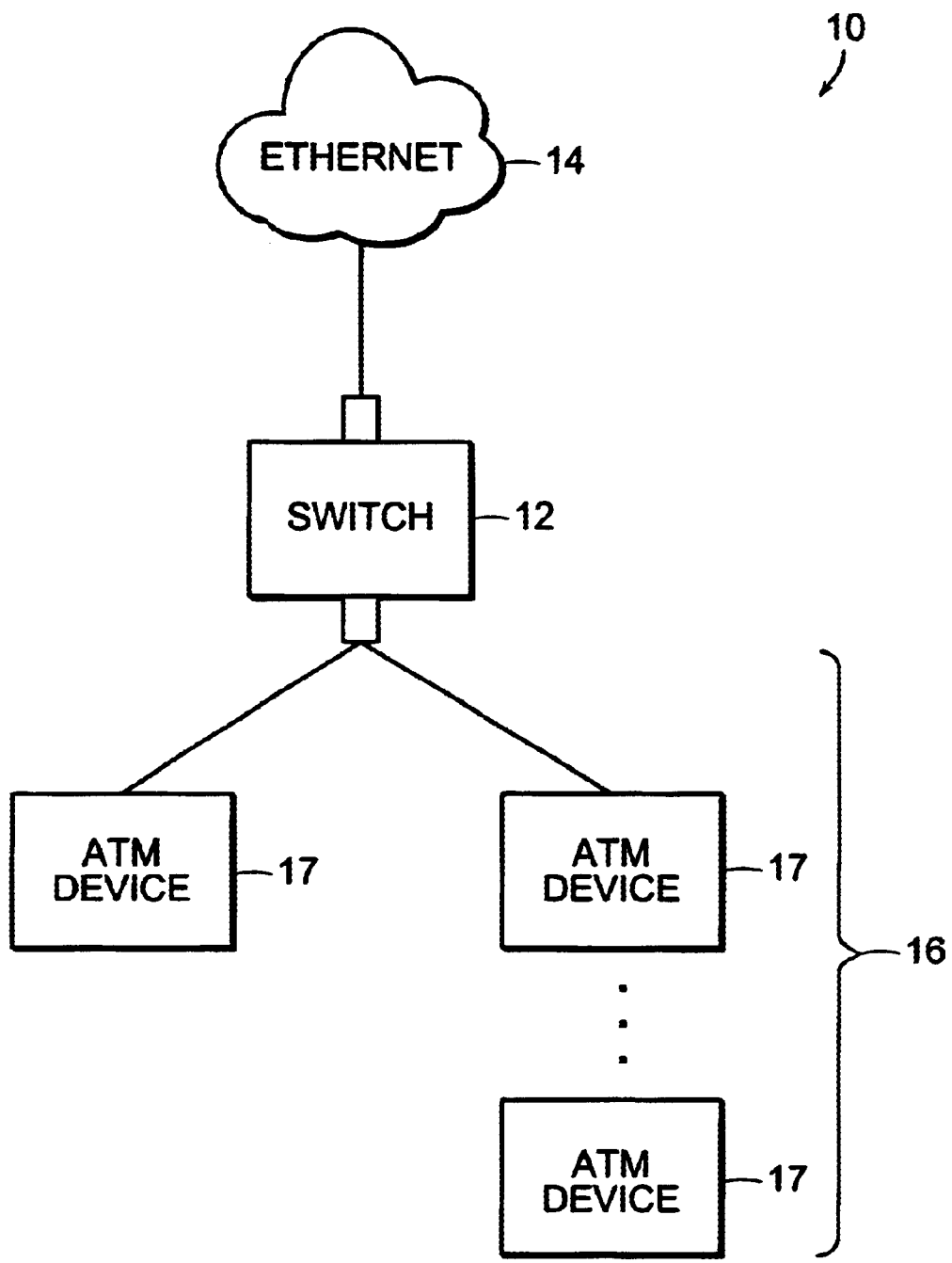
FIG. 1 schematically shows a simplified emulated local area network that may be utilized to implement preferred embodiments of the invention.
Figure 2:
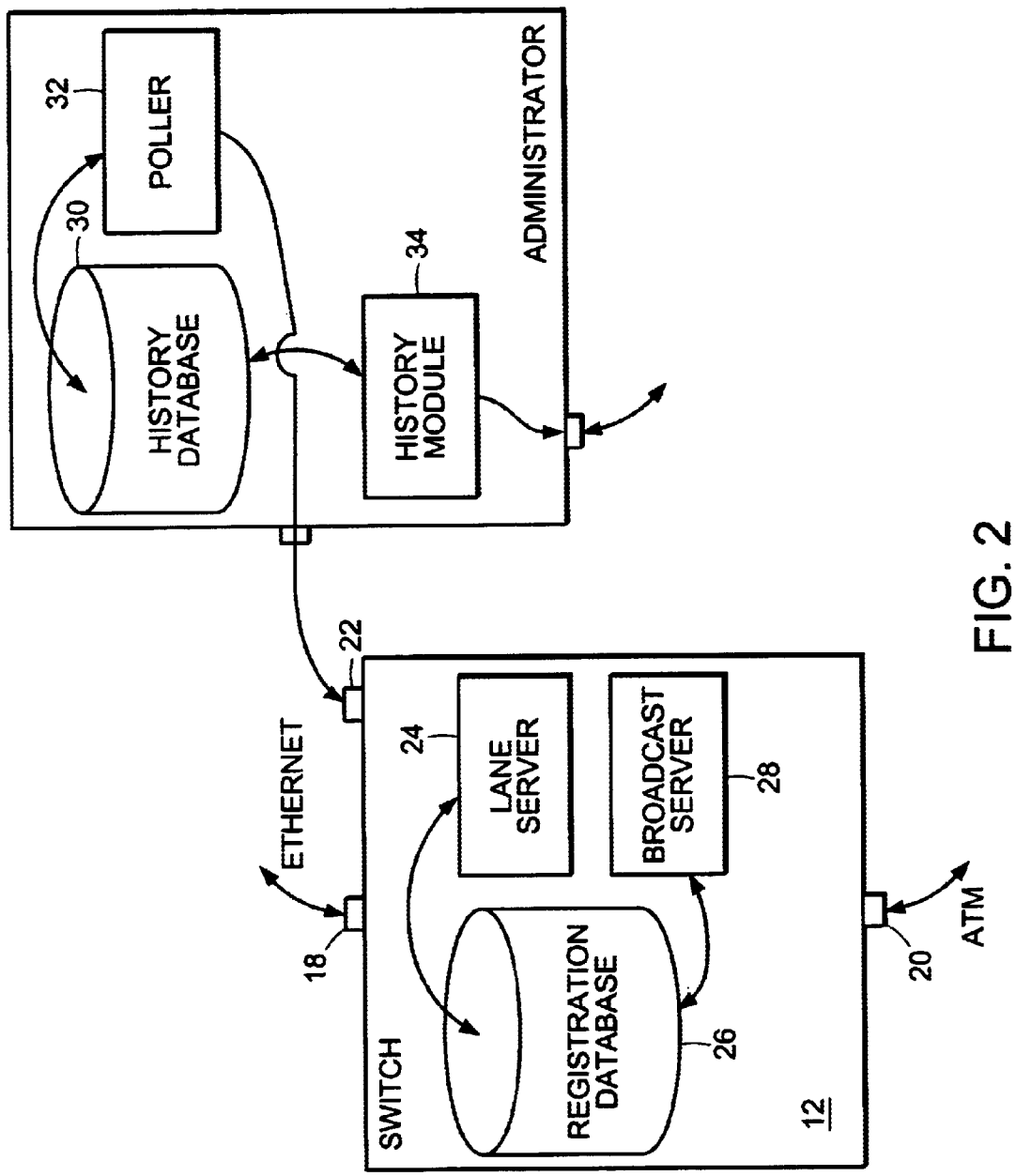
FIG. 2 schematically shows additional details of the emulated local area network of FIG. 1.

FIG. 1 shows a simplified ELAN 10 that may be utilized with preferred embodiments of the invention. The ELAN 10 may be one of many coupled with a larger network that is managed by some network management authority, such as a single network administrator 11 (FIG. 2). The ELAN 10 includes an Ethernet switch 12 coupled with an Ethernet network 14 and an ATM network 16. Network devices coupled to the ELAN 10 via either of the ATM network 16 or Ethernet network 14 may be referred to herein as "clients." The Ethernet network 14 may include a plurality of client network devices in a local area network ("LAN") that communicate via the Ethernet protocol. Among other things, such devices may include servers, computer systems, disk arrays for bulk nonvolatile data storage, workstations, routing devices, and printers. In a similar manner, the ATM network 16 also may include a plurality of client ATM devices 17, which may include servers, computer systems, disk arrays for nonvolatile data storage, workstations, routing devices, and printers. The switch 12 may be any switch known in the art, such as CENTILLION™ 100 Ethernet switch, distributed by NORTEL NETWORKS CORPORATION of Montreal, Quebec, in the country of Canada.

As is known in the art, a single switch 12 may implement multiple ELANS. Accordingly, the monitoring and reporting processes discussed herein may be utilized for multiple ELANS implemented by a single switch. It also should be noted that although specific types of network arrangements (i.e., ELAN arrangements) and protocols (i.e., Ethernet and ATM) are mentioned, their discussion is not intended to limit the scope of the invention. For example, principles of preferred embodiments may be applied to networks executing the well known Multiprotocol over ATM ("MPOA"). Accordingly, such network arrangements and protocols are discussed as exemplary modes of implementing various embodiments of the invention.

FIG. 2 schematically shows additional details of the ELAN 10 shown in FIG. 1. In particular, the switch 12 includes an Ethernet interface 18 for coupling with the Ethernet network 14, an ATM interface 20 for coupling with the ATM network devices, and a management interface 22 for interfacing with a network administrator's computer system 11. The management interface 22 can be any such type known in the art, such as a console coupled to the switch 12, an ATM connection via the ATM interface 20, an Ethernet connection via the Ethernet interface 18, or the network administrator's computer system 11 coupled via some other network protocol.

Similar to other Ethernet switches implementing an ELAN, the switch 12 includes a local area network emulation server ("LANE server 24") that manages the ELAN 10, a LANE server database (hereinafter referred to as "registration database 26") for storing selected information relating to channel-based network devices coupled to the ELAN 10, and a broadcast server 28 to manage broadcast network devices coupled to the ELAN 10. In preferred embodiments, the LANE server 24, registration database 26, and broadcast server 28 operate in accord with conventional processes. For example, each ATM network device in the ELAN 10 registers with the LANE server 24 when joined to the ELAN 10. As a part of the registration process, the LANE server 24 stores data in the registration database 26 listing each ATM network device coupled to the ELAN 10. In addition to listing their identity, the registration database 26 also may include both the ATM address and Ethernet address of each listed ATM device, and the virtual channel identifiers and virtual path identifiers of each ATM device. Accordingly, an address of an ATM device may be converted between ATM and Ethernet by accessing such data. In a similar manner when an ATM device is removed from the ELAN 10, its entry in the registration database 26 is deleted in accord with conventional processes.

The registration database 26 therefore includes a listing of each ATM device that is a member of the ELAN 10 substantially at the time that the database is accessed. The current status at a specified time (i.e., the time of accessing the registration database 26) of a given ATM device in the ELAN 10 thus may be ascertained by accessing the registration database 26. As known by those skilled in the art, historical data relating to the number of times an ATM device has been joined to or removed from a given ELAN is not stored in the registration database 26.

In accord with preferred embodiments of the invention, the network administrator's computer 11 (referred to herein as "control computer 11") includes a plurality of modules that compile historical data of devices in specified ELANS, and report such history to the network administrator in an easy to read format. The plurality of modules could either be implemented as software executing on the control computer 11, or as hardware that is coupled with the control computer 11.

To that end, the control computer 11 includes an interface 23 (i.e., input and/or output), a history database 30 for storing history data relating to ATM devices that either have been or are members of the ELAN 10, a poller 32 for generating the history data in the history database 30, and a history module 34 for determining the history of ATM devices coupled to the ELAN 10. As discussed below, the poller 32 polls the registration database 26 based upon a preconfigured polling interval to produce the history data from the data in the registration database 26. The status of each ATM network device of interest at each polling time therefore is stored in the history database 30 to generate the history database 30. Data retrieval methods other than polling, however, may be utilized. For example, instead of a poller 32, an asynchronous interrupt module may be utilized that queries the registration database 26 at various unrelated times, such as in response to input from another device. Accordingly, preferred embodiments of the invention are not intended to be limited to a polling mechanism for building the historical data in the history database 30. Further, the term poller may be used herein to represent other types of data retrieval methods.

In preferred embodiments, the history database 30 comprises a management information base ("MIB") that is instantiated and managed in accord with conventional processes. Accordingly, among other things, the poller 32 and history module 34 may utilize the well known Simple Network Management Protocol ("SNMP") and a MIB browser (as necessary) to manage and manipulate the history database 30 and the objects that comprises the MIB. For example, the well known SNMP device distributed under the trade name "EMANATETM" (distributed by SNMP Research International, Inc. of Knoxville, Tenn.) may be utilized. The previously noted term "object" as used herein refers to the well known software data structures (i.e., objects) that comprise any MIB configured in accord with conventional object-oriented programming techniques.

In alternative embodiments, the history database 30 and poller 32 are maintained by a server device (not shown) that is separate from the control computer 11. A plurality of other computer devices in the network therefore may include local history modules 34 for retrieving historical data from the history database 30 as needed. Inclusion of the history module 34, history database 30, and poller 32 in a single control computer 11 (FIG. 2) therefore is shown for exemplary purposes only.

Figure 3:
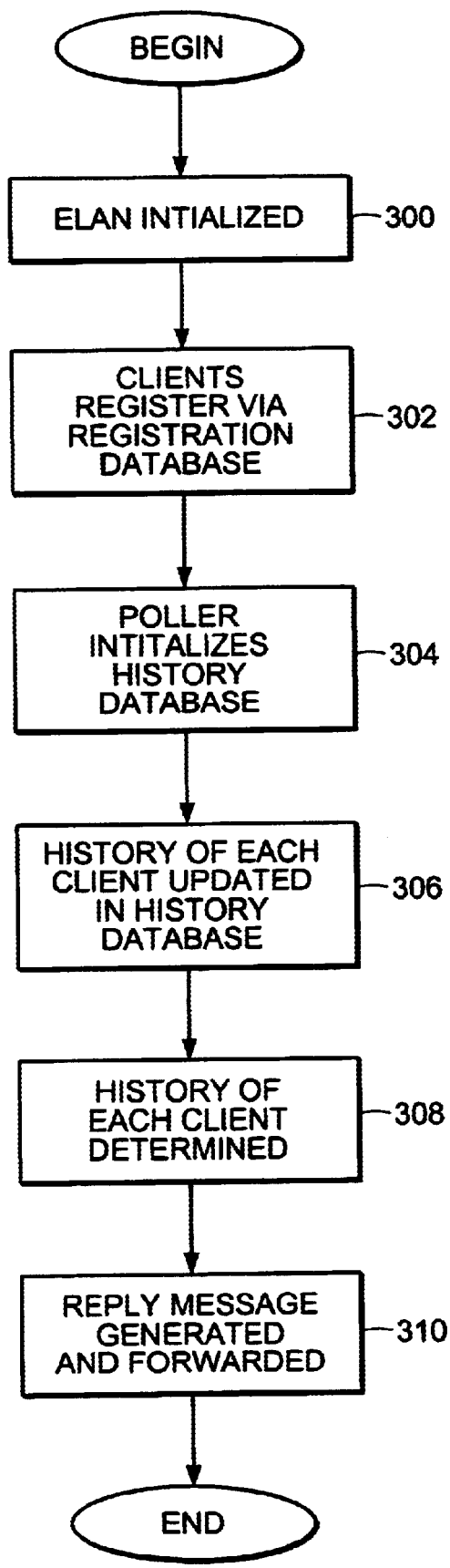
FIG. 3 shows a preferred process for tracking the history of one or more network devices in the emulated local area network shown in FIG. 1.

FIG. 3 shows a preferred process for tracking the history of one or more network devices in an emulated local area network shown in FIG. 1. The process begins at step 300 in which the ELAN 10 shown in FIGS. 1 and 2 is initialized in accord with conventional processes. Once initialized, the process continues to step 302 in which all channel-based clients coupled with the ELAN 10 register with the LANE server 24. As a part of the registration process, the LANE server 24 stores information in the registration database 26 identifying all such channel-based client devices as members of the ELAN 10, and their virtual channel and path identifiers. As suggested above, each such client notifies the LANE server 24 when it is to be removed from the ELAN 10. Accordingly, when a given client notifies the LANE server 24 that it is to be removed, the LANE server 24 consequently removes the entry in the registration database 26 for that given client.

The process then continues to step 304 in which the poller 32 initializes the history database 30. Once initialized, the poller 32 updates the history database 30 during each one of a preconfigured polling interval (step 306). During each data retrieval cycle, the poller 32 thus may retrieve all information stored in the registration database 26, such as the virtual channel identifier/virtual path identifiers of each ATM device in the ELAN. In preferred embodiments, the poller 32 is a JAVA applet that communicates with an SNMP module on the switch 12 to retrieve the necessary data from the registration database. In other embodiments, the poller 32 utilizes a Telnet (command line) interface, and/or a MIB browser. Depending upon the underlying configuration of the Ethernet switch 12 being polled, various combinations of SNMP, Telnet, and a MIB browser may be utilized to retrieve data from the registration database 26. As noted above, the history database 30 may be updated by other means, such as by an interrupt module.

In alternative embodiments, only selected data in the registration database 26 is retrieved and stored in the history database 30. For example, only a list of the clients in the registration database 26 may be retrieved, or data may be retrieved for specified clients only.

Once the ELAN 10 and databases are initialized, then the process continues to step 308 in which the history module 34 requests the current data of each registered ATM device from the history database 30. To that end, the history module 34 may forward an inquiry message to the history database 30 (i.e., the inquiry message is forwarded to a controller controlling the history database 30). The inquiry message may request data relating to one or more specific clients coupled to the ELAN 10, or may be a general inquiry requesting whether the status of any clients for the ELAN 10 has changed. If the history database 30 is remote from the control computer 11, then such inquiry may be transmitted from the control computer 11 to the device containing the history database 30 via the hypertext transfer protocol. Similar to the poller 32, the history module 34 preferably is a JAVA applet.

In some embodiments, the history database 30 may be preconfigured to transmit a status message to the history module 34 whenever a specified event occurs, such as when a change in the status of any client in the ELAN 10 has occurred. Such status message may include any preconfigured information, such as historical information for each client that is a member of the ELAN 10, or historical information for selected clients in the ELAN 10.

Upon receipt of a status inquiry, the history database 30 determines the history of each client (or selected clients) as requested in the inquiry message. In a manner similar to the process of polling the registration database 26 discussed above, the historical data for each client preferably is retrieved from the history database 30 via SNMP. Once retrieved, selected parts of the historical data are added to a reply message that is forwarded by a reply message generator to the history module 34 (step 310). Such historical data may be any data that is requested by the inquiry message, such as data identifying the history of specific clients, data identifying each client that has been removed from the ELAN 10 since the previous check of the history database 30, data identifying each client that has been added to the ELAN 10 since the previous check of the history database 30, or data identifying each client that has changed its LANE server 24, broadcast server 28, or virtual channel/virtual path identifiers. As known in the art, a client generally changes its virtual path/channel identifiers when it is removed from an ELAN, and subsequently is re-joined to the ELAN.

Figure 4:
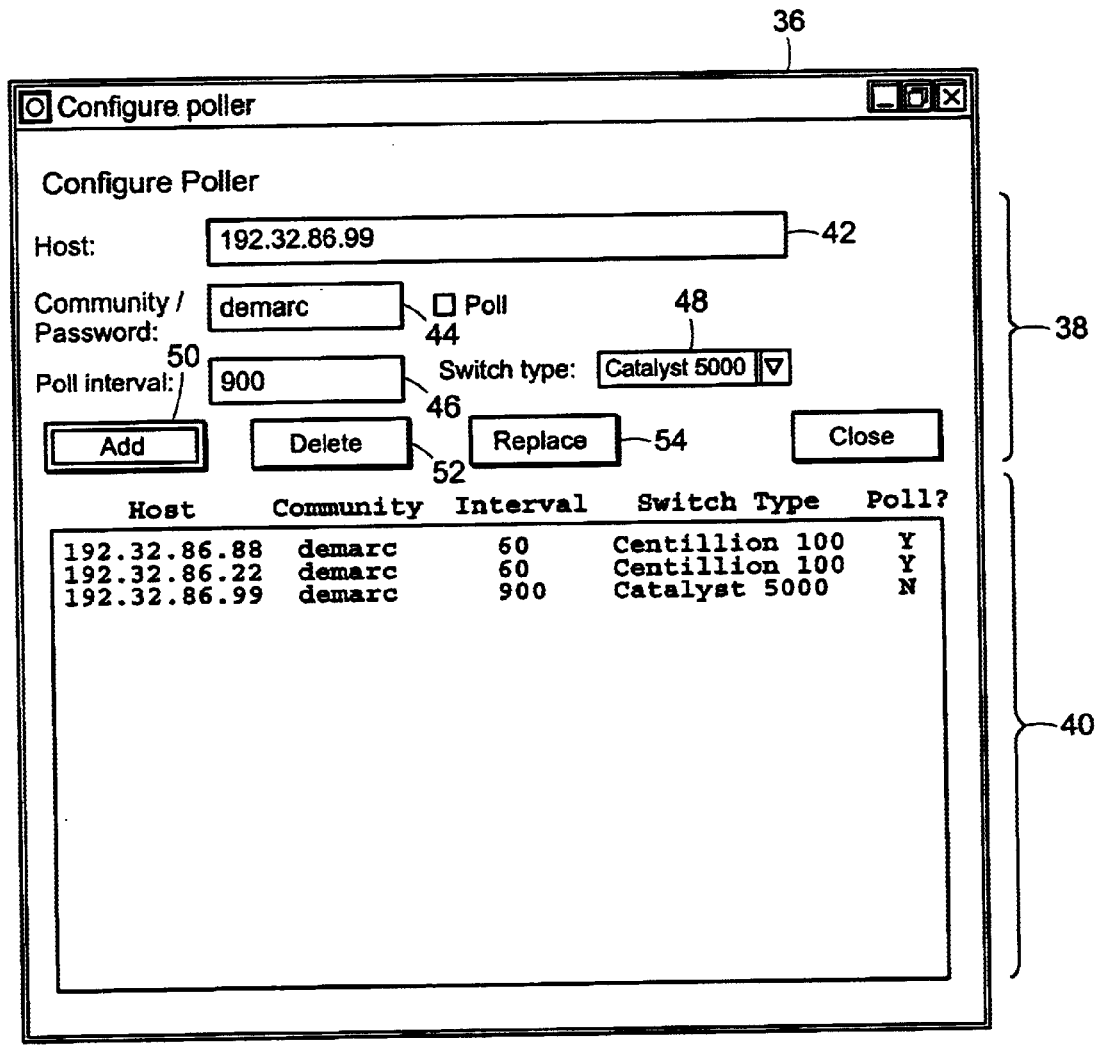
FIG. 4 shows a configuration graphical user interface for configuring a polling application in accord with preferred embodiments of the invention.
Figure 5:
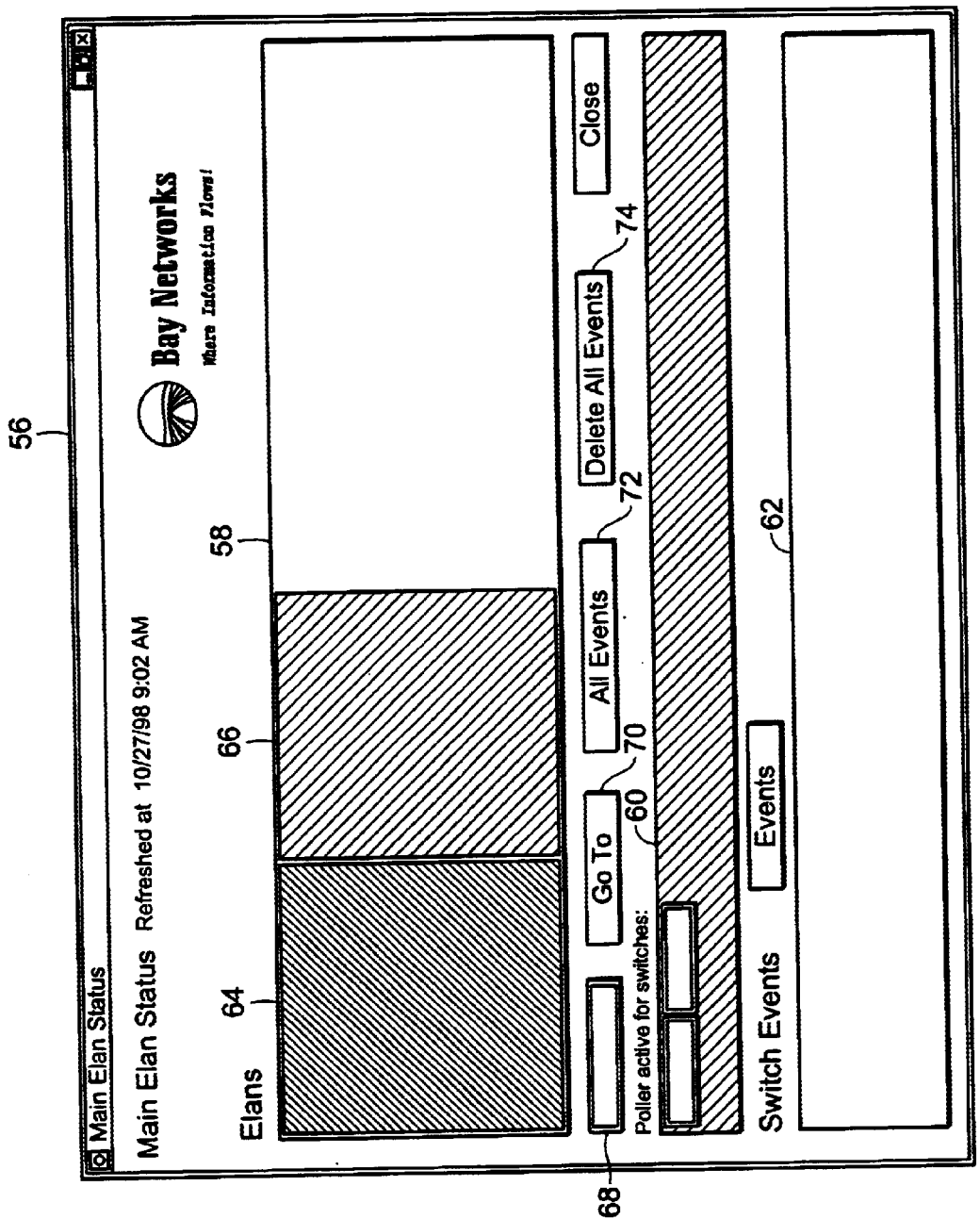
FIG. 5 shows a network graphical user interface that may be utilized to track network devices in one or more emulated local area networks.

Once received by the history module 34, the data received from the history database 30 may be displayed on a display device on the control computer 11, or may be forwarded to other network devices monitoring the ELAN 10. FIGS. 4–6 show three exemplary GUIs that are utilized in preferred embodiments of the invention. Specifically, FIG. 4 shows a configuration GUI 36 that may be utilized by the control computer 11 to configure the poller 32 and history module 34. More particularly, as suggested above, the control computer 11 preferably communicates with the LANE server 24 via a World Wide Web browser ("browser"). The browser may be any browser that utilizes conventional hypertext transfer protocol ("HTTP") and hypertext markup language ("HTML") to communicate with the LANE server 24, such as NETSCAPE NAVIGATOR™, distributed by Netscape Communications Corporation of Mountain View, Calif. The GUIs thus may be utilized as templates that are transmitted between the switch 12 (i.e.,the poller 32 and history module 34) and the control computer 11 via the one of the switch servers.

In accord with preferred embodiments, the configuration GUI 36 includes several fields that permit the administrator 11 to configure the poller 32 for one or more ELANS. In particular, the configuration GUI 36 includes a top window 38 for entering configuration data for a given switch 12, and a bottom window 40 showing configuration parameters for each switch 12 being monitored. The top window 38 includes several fields for configuring the poller 32 for the given switch 12, such as:

- an address field 42 for the address of the management interface 22 for the given switch 12;
- a password field 44 for entering a password that permits the network administrator to configure the poller 32;
- the polling field 46 for entering the polling interval for the switch 12 (e.g., every 900 seconds); and
- a switch type field 48 for entering the switch type of given switch 12.

After each field is completed, an ADD button 50 may be selected, thus adding the specified switch 12 to the list of switches shown in the bottom window 40. The configuration GUI 36 also includes a DELETE button 52 for removing one of the listed switches 12 from the list in the bottom window 40, and a REPLACE button 54 for replacing one of the switches 12 listed in the bottom window 40.

FIG. 5 shows a network GUI 56 that displays each ELAN that is monitored as configured by the configuration GUI 36. In particular, the network GUI 56 includes an ELAN window 58 identifying each ELAN being monitored, a poller active window 60 showing which switches 12 have an active poller 32, and a switch event window 62 showing switch events (e.g., if a switch is malfunctioning). In accord with a preferred embodiment of the invention, the ELAN window 58 includes a block that is color coded for each ELAN that is active in the network. For example, the given network displayed by FIG. 5 includes a first ELAN represented by first colored block 64, and a second ELAN represented by a second colored block 66. The color associated with an ELAN's block identifies whether one or more clients in such ELAN have a status change (i.e., been joined to or removed from the ELAN). For example, a red block represents that a given ELAN has a client that has been removed since the previous check of the history database 30, a yellow block represents that a given ELAN 10 has a client that has a changed status (i.e., a new virtual channel/path identifier) since the previous check of the history database 30, and a green block represents that a given ELAN 10 has no changed clients and no clients that have been removed since the previous check of the history database 30.

The network GUI 56 also may include a plurality of other buttons that provide further functionality. For example, those buttons may include:

- a STOP POLLER button 68 that stops the poller 32 for a selected switch 12;
- a CONFIGURE POLLER button 70 that calls the configuration GUI 36 shown in FIG. 4;
- an ACKNOWLEDGE ALL EVENTS button 72 that changes the color of a selected ELAN block to green, indicating that the events for such ELAN have been reviewed by the network administrator; and
- a DELETE ALL EVENTS button 74 that deletes events.

FIG. 6 shows an ELAN status GUI 76 that shows the status of a specific ELAN. In preferred embodiments, the ELAN status GUI 76 is displayed upon selection of one of the colored ELAN blocks shown in FIG. 5. Among other things, the ELAN status GUI 76 shows the name of the ELAN that was selected, the IP address of the management interface for the switch 12 implementing the ELAN, the ATM address of the LANE server 24 and broadcast server 28 for the listed switch 12, and a window listing each ATM client in the ELAN. The listing of each client includes client specific data, such as each client's ATM address, its virtual channel/path information, and the time and date it was last polled. In addition, the ELAN status GUI 76 also includes an event acknowledge window 78 showing each client that had an associated event since a previous check of the history database 30 (i.e., if it joined, was removed from, or has a changed virtual path/channel identifier for the ELAN since a previous check of the history database 30). In some embodiments, selection of one of the LANE clients in the event acknowledge window 78 produces a client history GUI (not shown) that displays the history of the selected client.

Accordingly, in summary, a network administrator 11 may configure the poller 32 with the poller GUI (FIG. 4) to begin the process of maintaining the history database 30. Once configured, the administrator 11 may check the network GUI 56 to determine which ELANS are being monitored. The administrator 11 then may select one of the displayed ELANS to produce the ELAN status GUI 76 for the selected ELAN. The history for one of the monitored ELAN clients then may be ascertained by reviewing the clients identified in the acknowledge window.

It should be noted that preferred embodiments utilize a monitoring application program interface ("monitoring API") for communicating with the underlying switch platform. Specifically, each platform preferably is configured to communicate with the history module 34 via a set of common commands. Accordingly, any given history module 34 may retrieve history data from any ELAN 10 that is implementing the monitoring API.

As noted above and shown in FIG. 2, the poller 32, history database 30 and history module 34 may be maintained on the control computer 11. In some embodiments (noted above), the poller 32 and history database 30 are maintained on a separate network device that is coupled with the switch 12 and the control computer 11. In still other embodiments, the poller 32, history database 30, and history module 34 are maintained on the switch 12.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits), or other related components. As noted above, preferred embodiments are implemented as a JAVA applet.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of determining a history of at least one of a set of network devices coupled to a network, the set of network devices utilizing a channel based protocol, the current status of each of the set of network devices being stored in a registration memory, the method comprising:

recording, in a history memory at selected times, the current status of the at least one of the set of network devices that is stored in the registration memory, to collect recordings in the history memory that provide a history for the at least one of the set of network devices;

receiving an inquiry message requesting information about the at least one of the set of network devices; and generating a reply message having device data representing at least one of the current status and history of the at least one of the set of network devices, the device data being retrieved from the history memory in response to the receipt of the inquiry message.

2. The method as defined by claim 1 wherein the set of network devices are members of an emulated local area network.

3. The method as defined by claim 1 further comprising:

forwarding the reply message to an administrator network device.

4. The method as defined by claim 1 wherein the act of recording the history of the at least one of the set of network devices comprises:

polling the registration memory every polling interval and retrieving the device data; and updating the history memory based upon the device data retrieved from the registration memory during each polling interval.

5. The method as defined by claim 4 wherein during each polling interval, the act of updating comprises:

recording data indicating the current status of the at least one of the set of network devices.

6. The method as defined by claim 1 wherein the at least one of the set of network devices communicates via the asynchronous transfer mode protocol.

7. The method as defined by claim 1 wherein the network includes a LAN network device that communicates with other network devices in the network at least in part via a non-channel based protocol.

8. The method as defined by claim 7 wherein the LAN network device communicates via the Ethernet protocol.

9. The method as defined by claim 1 wherein the history for the at least one of the set of network devices is stored in a management information base.

10. An apparatus for determining a history of at least one of a set of network devices coupled to a network, the set of network devices utilizing a channel based protocol, the current status of each of the set of network devices being stored in a registration memory, the apparatus comprising:

a history memory;

a status recorder that records, in the history memory at selected times, the current status of the at least one of the set of network devices stored in the registration memory to collect recordings in the history memory that provide a history for the at least one of the set of network devices;

an input that receives an inquiry message requesting information about the at least one of the set of network devices; and a reply message generator operatively coupled with the input to receive the inquiry message and responsively generate a reply message, the reply message having device data representing at least one of the current status and history of the at cast one of the set of network devices, the device data being retrieved from the history memory.

11. The apparatus as defined by claim 10 wherein the set of network devices are members of an emulated local area network.

12. The apparatus as defined by claim 10 further comprising:

an output operatively coupled with the reply message generator, the output forwarding the reply message to an administrator network device.

13. The apparatus as defined by claim 10 wherein the poller polls the registration memory every polling interval, the poller updating the history memory based upon the data retrieved from the registration memory during each polling interval.

14. The apparatus as defined by claim 13 wherein during each polling interval, the poller records data indicating the current status of the at least one of the set of network devices.

15. The apparatus as defined by claim 10 wherein the at least one of the set of network devices communicates via the asynchronous transfer mode protocol.

16. The apparatus as defined by claim 10 wherein the network includes a LAN network device that communicates with other network devices in the network at least in part via a non-channel based protocol.

17. The apparatus as defined by claim 16 wherein the LAN network device communicates via the Ethernet protocol.

18. The apparatus as defined by claim 10 wherein the history memory includes a management information base that stores the history of the at lest one of the set of network devices.

19. A computer program product for use on a computer system for determining the history of at least one of a set of network devices coupled to a network, the set of network devices utilizing a channel based protocol, the current status of each of the set of network devices being stored in a registration memory, computer program product comprising computer usable medium having computer readable program code thereon, the computer readable program code including:

program code that maintains a history memory;

program code that records, in the history memory at selected times, the current status of the at least one of the set of network devices stored in the registration memory to collect recordings in the history memory that provide a history for the at least one of the set of network devices;

program code that receives an inquiry message requesting information about the at least one of the set of network devices; and program code that generates a reply message having device data representing at least one of the current status and history of the at least one of the set of network devices, the device data being retrieved from the history memory in response to receipt of the inquiry message.

20. The computer program product as defined by claim 19 wherein the set of network devices are members of an emulated local area network.

21. The computer program product as defined by claim 19 further comprising:

program code that forwards the reply message to an administrator network device.

22. The computer program product as defined by claim 19 wherein the program code that records the history of the at least one of the set of network devices comprises:

program code that polls the registration memory every polling interval to retrieve the device data; and program code that updates the history memory based upon the device data retrieved from the registration memory during each polling interval.

23. The computer program product as defined by claim 22 wherein during each polling interval, the program code that updates comprises:

program code that records data indicating the current status of the at least one of the set of network devices.

24. The computer program product as defined by claim 19 wherein the at least one of the set of network devices communicates via the asynchronous transfer mode protocol.

25. The computer program product as defined by claim 19 wherein the network includes a LAN network device that communicates with other network devices in the network at least in part via a non-channel based protocol.

26. The computer program product as defined by claim 25 wherein the LAN network device communicates via the Ethernet protocol.

27. The computer program product as defined by claim 19 wherein the history for the at least one of the set of network devices is stored in a management information base, the program code that records including program code that manages the management information base.

28. A method of tracking the history of a given network device coupled to a network, the given network device being a member of a set of network devices that utilize a channel based protocol, the current status of each of the network devices in the set of network devices being stored in a registration memory, the method comprising:

accessing the registration memory at selected times to determine the current status of the given network device at each selected time; and recording each determined current status in a history memory to collect recordings in the history memory that produce history data for the given network device.

29. The method as defined by claim 28 further comprising:

retrieving the history data for the given network device from history memory in response to a request for the history data; and including the history data in a history message.

30. The method as defined by claim 29 further comprising:

forwarding the history message to another network device coupled to the network.

31. The method as defined by claim 28 wherein the channel based protocol is asynchronous transfer mode.

32. The method as defined by claim 28 wherein the current status is recorded in the history memory every preselected interval.

33. The method as defined by claim 28 wherein the history of the given network device is stored in a management information base within the history memory.

34. The method as defined by claim 28 wherein the current status of the given network device at one or more times is stored in the history memory.

35. The method as defined by claim 28 wherein the history data for the given network device indicates if the given network device is a member of the network at various times.

36. An apparatus for tracking the history of a given network device coupled to a network, the given network device being a member of a set of network devices that utilize a channel based protocol, the current status of each of the network devices in the set of network devices being stored in a registration memory, the apparatus comprising:

a history memory;

a registration memory access module that accesses the registration memory at selected times to determine the current status of the given network device at each selected time; and a status recorder that records each determined current status in the history memory to collect recordings in the history memory that produce history data for the given network device.

37. The apparatus as defined by claim 36 further comprising:
means for retrieving the history data for the given network device from history memory in response to a request for the history data; and
means for including the retrieved history data in a history message.

38. The apparatus as defined by claim 37 further comprising:
an output that forwards the history message to another network device coupled to the network.

39. The apparatus as defined by claim 36 wherein the channel based protocol is asynchronous transfer mode.

40. The apparatus as defined by claim 36 wherein the current status is recorded in the history memory every preselected interval.

41. The apparatus as defined by claim 36 wherein the history memory includes a management information base for storing the history of the given network device.

42. A computer program product for use on a computer system for tracking the history of a given network device coupled to a network, the given network device being a member of a set of network devices that utilize a channel based protocol, the current status of each of the network devices in the set of network devices being stored in a registration memory, the computer program product comprising a computer usable medium having computer readable program code thereon, the computer readable program code including:
program code that accesses the registration memory at selected times to determine the current status of the given network device at each selected time;
program code that maintains a history memory; and
program code that records each determined current status in the history memory to collect recordings in the history memory that produce history data for the given network device.

43. The computer program product as defined by claim 42 further comprising:
program code that retrieves the history data for the given network device from history memory in response to a request for the history data; and
program code that includes the history data in a history message.

44. The computer program product as defined by claim 43 further comprising:
program code that forwards the history message to another network device coupled to the network.

45. The computer program product as defined by claim 42 wherein the channel based protocol is asynchronous transfer mode.

46. The computer program product as defined by claim 42 wherein the current status is recorded in the history memory every preselected interval.

47. The computer program product as defined by claim 42 wherein the history of the given network device is stored in a management information base within the history memory.

48. A method of determining the history of a given network device in a set of network devices coupled to a network, the set of network devices utilizing a channel based protocol, the current status of the given network device being stored in a registration memory, the method comprising:
forwarding an inquiry message from a first network device to a second network device, the inquiry message requesting information about the given network device;
recording, at selected times in a history memory associated with the second network device, the current status of the given network device stored in the registration memory to collect recordings that provide a history for the given network device;
generating a reply message in response to receipt of the inquiry message, the reply message having device data representing at least one of the current status and the history of the given network device; and
forwarding the reply message to the first network device.

49. The method as defined by claim 48 further comprising:
extracting the device data from the reply message; and
displaying the extracted device data on a graphical user interface on the first network device.

50. The method as defined by claim 48 further comprising:
displaying a configuration graphical user interface on the first network device, the configuration graphical user interface including fields for entering polling data for polling the registration memory.

* * * * *